(12) United States Patent
Fu et al.

(10) Patent No.: US 11,705,817 B2
(45) Date of Patent: Jul. 18, 2023

(54) LLC RESONANT CONVERTER WITH RECTIFIERS PROCESSING PARTIAL LOAD CURRENT

(71) Applicant: Monolithic Power Systems, Inc., San Jose, CA (US)

(72) Inventors: Dianbo Fu, San Jose, CA (US); Daocheng Huang, San Jose, CA (US); Junjie Feng, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 116 days.

(21) Appl. No.: 17/492,271

(22) Filed: Oct. 1, 2021

(65) Prior Publication Data

US 2023/0105552 A1    Apr. 6, 2023

(51) Int. Cl.
*H02M 3/335* (2006.01)
(52) U.S. Cl.
CPC ... *H02M 3/33573* (2021.05); *H02M 3/33576* (2013.01)

(58) Field of Classification Search
CPC .................. H02M 3/33573; H02M 3/33576
See application file for complete search history.

(56) References Cited

U.S. PATENT DOCUMENTS

| 10,819,244 B1* | 10/2020 | Shi .................. H02M 3/33573 |
| 2015/0103561 A1* | 4/2015 | Dai .................. H02M 3/33546 363/17 |

* cited by examiner

*Primary Examiner* — Kyle J Moody
(74) *Attorney, Agent, or Firm* — Perkins Coie LLP

(57) ABSTRACT

An LLC resonant converter including a transformer, a switching full-bridge circuit, a resonant circuit, and a bridge rectifier. The switching full-bridge circuit has a first pair of switches and a second pair of switches, with the first pair of switches being connected between a DC input voltage and a second end of a secondary winding of the transformer, the second pair of switches being connected between a DC input voltage and a first end of the secondary winding of the transformer.

18 Claims, 4 Drawing Sheets

US 11,705,817 B2

LLC RESONANT CONVERTER WITH RECTIFIERS PROCESSING PARTIAL LOAD CURRENT

TECHNICAL FIELD

The present invention is directed to LLC resonant converters and power supplies incorporating same.

BACKGROUND

Converters are electrical circuits that convert an input voltage to an output voltage. An LLC resonant converter is a type of converter that converts a direct current (DC) input voltage to a DC output voltage using a resonant circuit that comprises a resonant capacitor, a resonant inductor, and a magnetizing inductance of a transformer. The LLC resonant converter includes a switching bridge circuit that transforms the DC input voltage to a square wave. The square wave excites the resonant circuit to output a sinusoidal signal, which gets scaled by a transformer. The scaled signal is rectified by a bridge rectifier, and an output capacitor filters the rectified output to generate the DC output voltage. The switching bridge circuit and the rectifier are on opposite sides of a core of the transformer. More specifically, the switching bridge circuit is on a primary side (also referred to as "high-voltage side") of the transformer, whereas the rectifier is on a secondary side (also referred to as "low-voltage side") of the transformer. Especially, the switching bridge circuit is connected between a positive end and a negative end (i.e., ground) of the DC input voltage.

Embodiments of the present invention pertain to an LLC resonant converter with a novel topology.

BRIEF SUMMARY

In one embodiment, an LLC resonant converter comprises a switching full-bridge circuit, a transformer, a resonant circuit and a bridge rectifier. The switching full-bridge circuit comprises a first transistor, a second transistor, a third transistor and a fourth transistor with each transistor having a first end and a second end. The first ends of the first transistor and of the third transistor are connected to a DC input voltage, the second ends of the first transistor and of the third transistor are respectively connected to the first end of the second transistor and to the first end of the fourth transistor. The transformer comprises a primary winding and a secondary winding with each winding having a first end and a second end. The first end of the secondary winding is connected to the second end of the fourth transistor and the second end of the secondary winding is connected to the second end of the second transistor. The resonant circuit comprises a resonant capacitor, a resonant inductor, and a magnetizing inductance of the primary winding of the transformer. The resonant circuit is connected between a first switch node formed by the first and second transistors and a second switch node formed by the third and fourth transistors. The bridge rectifier is connected between the first end and the second end of the secondary winding to generate a rectified output signal that is filtered to generate a DC output voltage at the output node.

In another embodiment, a power supply comprises a switching full-bridge circuit, a transformer, a resonant circuit and a bridge rectifier. The switching full-bridge circuit comprises a first transistor, a second transistor, a third transistor and a fourth transistor with each transistor having a first end and a second end. The first ends of the first transistor and of the third transistor are connected to a DC input voltage. The second ends of the first transistor and of the third transistor are respectively connected to the first end of the second transistor and to the first end of the fourth transistor. The transformer comprises a primary winding and a secondary winding with each winding having a first end and a second end. The first end of the secondary winding is connected to the second end of the fourth transistor and the second end of the secondary winding is connected to the second end of the second transistor. The resonant circuit comprises a resonant capacitor, a resonant inductor, and a magnetizing inductance of the primary winding of the transformer. The resonant circuit is connected between a first switch node formed by the first and second transistors and a second switch node formed by the third and fourth transistors. The bridge rectifier is connected between the first end and the second end of the secondary winding to generate a rectified output signal that is filtered to generate a DC output voltage at the output node. The LLC resonant controller is configured to generate control signals that control switching of the first, second, third, fourth transistors to generate the DC output voltage on an output capacitor.

In yet another embodiment, a method of generating an output voltage at an output node of an LLC resonant converter includes alternately switching a first pair of switches and a second pair of switches of a switching full-bridge circuit to excite a resonant circuit and to flow a first sinusoidal current through a primary side of a transformer and to the output node. The method further includes inducing a second sinusoidal current through a coupling between a primary winding and a secondary winding of the transformer and flowing the second sinusoidal current through a secondary side of the transformer and to the output node. The method also includes rectifying, by a bridge rectifier, the first and second sinusoidal currents that flows through the primary and secondary sides of the transformer. The method further includes filtering a rectified output of the bridge rectifier to generate the output voltage of the LLC resonant converter.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

For illustration purposes only, the transistors disclosed herein are metal-oxide-semiconductor-field-effect-transistors (MOSFETs) that each has a first end (e.g., drain), a second end (e.g., source), and a control end (e.g., gate). As can be appreciated, other types of transistors may also be employed with appropriate changes to the connections explained below.

Figure 1:
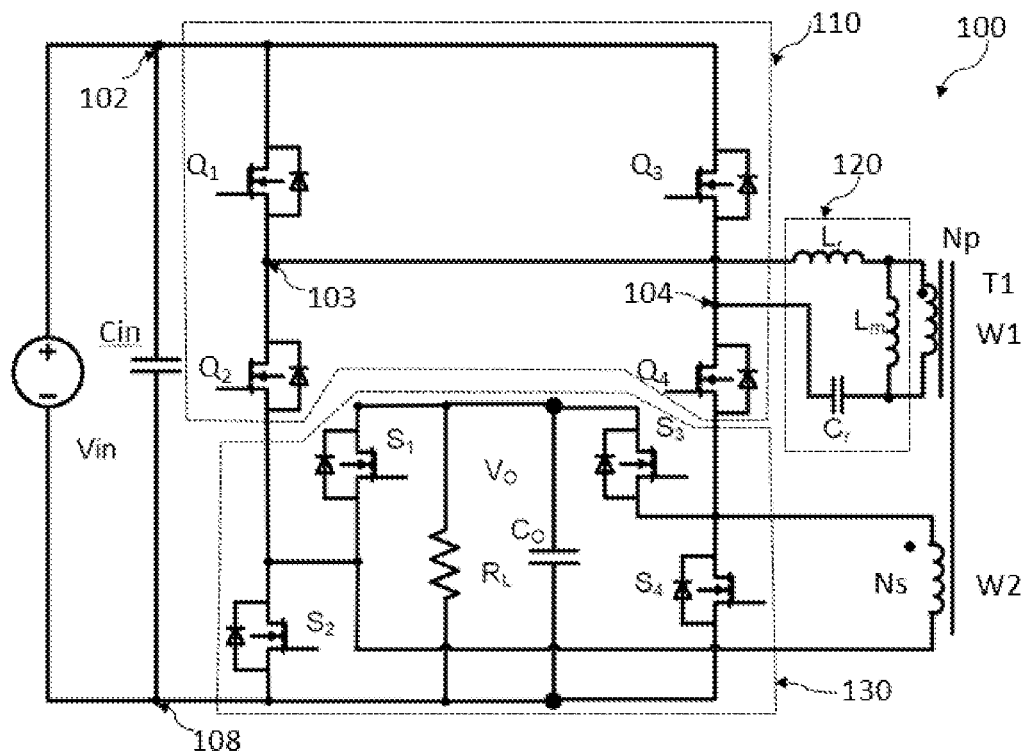
FIG. 1 shows a schematic diagram of an LLC resonant converter in accordance with an embodiment of the present invention.

FIG. 1 shows a schematic diagram of an LLC resonant converter 100 in accordance with an embodiment of the present invention. In the example of FIG. 1, the converter 100 comprises a switching bridge circuit 110, a resonant circuit 120, a transformer T1, and a bridge rectifier circuit 130.

In the example of FIG. 1, the switching bridge circuit 110 comprises a switching full-bridge circuit which comprises transistors Q1, Q2, Q3 and Q4. The drain of the transistor Q1 is connected to a positive end of a DC input voltage Vin at an input voltage node 102 and the source of the transistor Q1 is connected to the drain of the transistor Q2 at a first switch node 103. Similarly, the drain of the transistor Q3 is also connected to the positive end of the DC input voltage Vin at the input voltage node 102 and the source of the transistor Q3 is connected to the drain of the transistor Q4 at a second switch node 104.

A transformer T1 comprises a W1 and a secondary winding W2. The primary winding W1 and the secondary winding W2 are wound to have a polarity in accordance with the dot convention as shown. The primary winding W1 has a magnetizing inductance Lm.

The resonant circuit 120 comprises a resonant capacitor Cr, a resonant inductor Lr, and the magnetizing inductance Lm of the primary winding W1 of the transformer T1. The resonant capacitor Cr, the resonant inductor Lr and the magnetizing inductance Lm of the primary winding W1 form a series circuit that forms a resonant tank. In the example of FIG. 1, a first end of the resonant inductor Lr is connected to the first switch node 103 and a second end of the resonant inductor Lr is connected to a first end of the primary winding W1. A second end of the primary winding W1 is connected to a first end of the resonant capacitor Cr and a second end of the resonant capacitor Cr is connected to the second switch node 104.

The bridge rectifier circuit 130 comprises a full-bridge rectifier circuit which comprises transistors S1, S2, S3, and S4. The drains of the transistors S3 and S1 are connected to an output voltage Vo at an output voltage node 101. The sources of the transistors S4 and S2 are connected to a negative end of the input voltage Vin at a reference node 108. The source of the transistor S3 is connected to the drain of the transistor S4 to form a switch node that is connected to a first end of the secondary winding W2. The source of the transistor S1 is connected to the drain of the transistor S2 to form a switch node that is connected to the second end of the secondary winding W2. The first end of the secondary winding W2 is connected to the source of the transistor Q4. The second end of the secondary winding W2 is connected to the source of the transistor Q2.

An input capacitor Cin, which serves as a noise filter, is across the DC input voltage Vin. The DC output voltage Vo is developed across an output capacitor Co, which filters the rectified output of the full-bridge rectifier circuit 130. A resistor RL represents the load of the converter 100.

Figure 2:
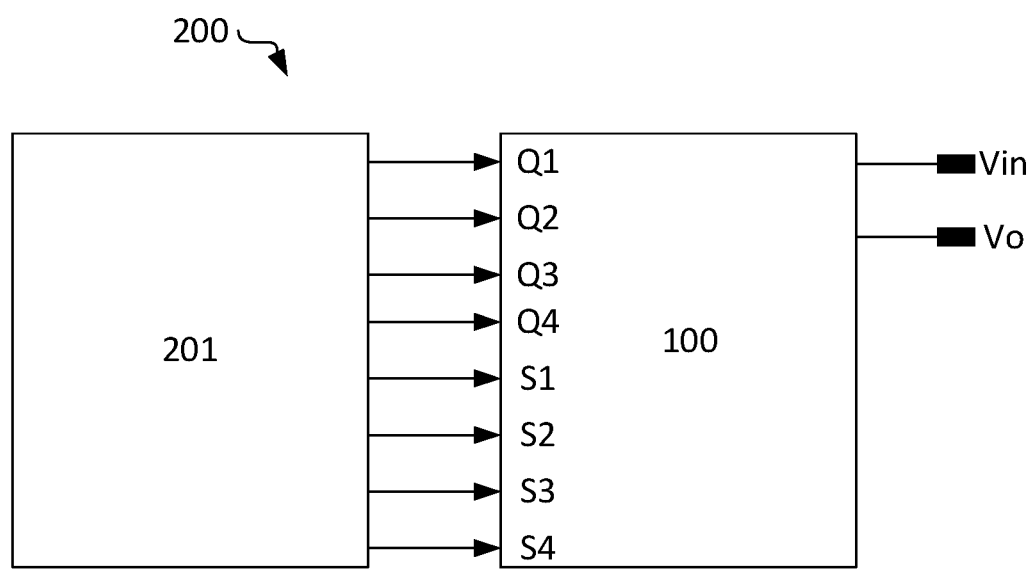
FIG. 2 shows a schematic diagram of a power supply with the LLC resonant converter of FIG. 1 in accordance with an embodiment of the present invention.

FIG. 2 shows a schematic diagram of a power supply 200 in accordance with an embodiment of the present invention. The power supply 200 comprises an LLC resonant controller 201 and the LLC resonant converter 100. The LLC resonant controller 201 may comprise a commercially-available LLC resonant controller or may be adapted from an existing LLC resonant controller. LLC resonant controllers are available from various vendors including Monolithic Power Systems, Inc. The controller 201 is configured to switch the transistors of the converter 100 (i.e., Q1, Q2, Q3, Q4, S1, S2, S3, and S4) by generating control signals to drive the gates of the transistors. As is well-known, a control signal may switch an MOS transistor by controlling its gate-to-source voltage.

The controller 201 controls the transistors Q1, Q2, Q3 and Q4 to generate, respectively at the first switch node 103 and the second switch node 104, a square wave that excites the resonant circuit 120 to generate a sinusoidal signal. The sinusoidal signal is scaled by the turns ratio of the primary winding W1 and the secondary winding W2. The turns ratio of the primary winding W1 and the secondary winding W2 may be adjusted for different scaling requirements. The controller 201 controls the transistors S1-S4 to rectify the scaled sinusoidal signal. The output capacitor Co filters the rectified signal to develop the output voltage Vo, which is delivered to the load RL. Generally, the resonant circuit 120 works as a voltage divider. The impedance of the resonant circuit 120 increases when not in resonance, thereby lowering the output voltage Vo. The controller 201 adjusts the switching frequency of the transistors Q1, Q2, Q3 and Q4, and thus the operating frequency of the resonant circuit 120, to maintain the output voltage Vo within regulation.

Figure 3:
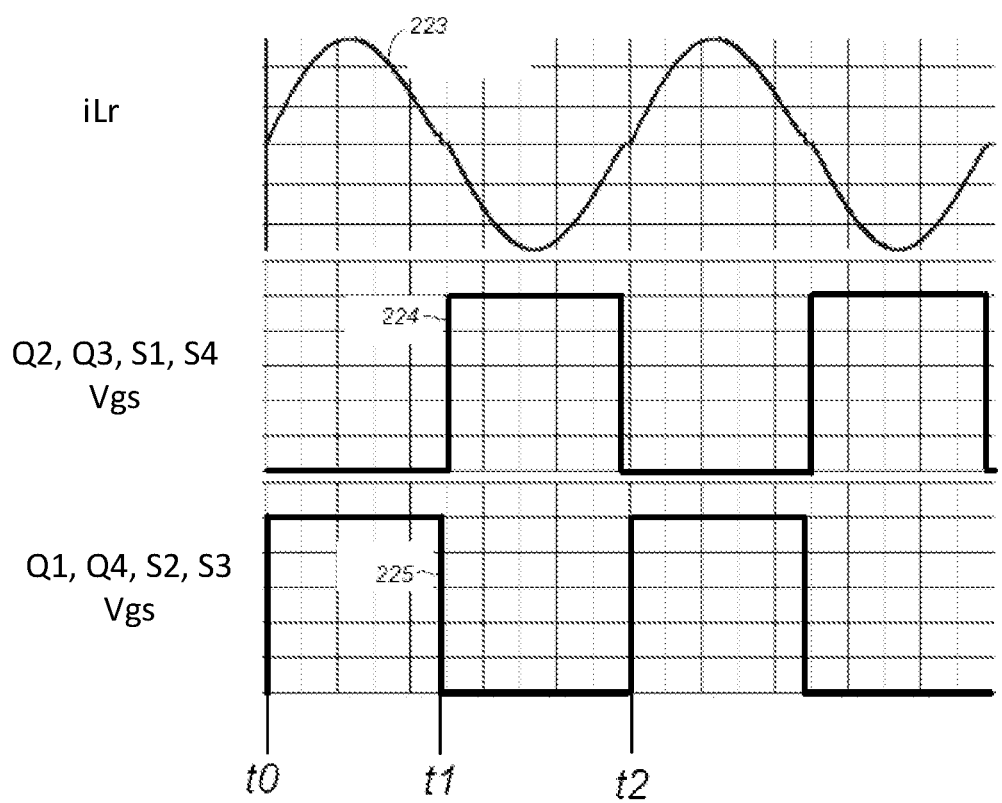
FIG. 3 shows simulated waveforms of signals of the power supply of FIG. 2 in accordance with an embodiment of the present invention.
Figure 4:
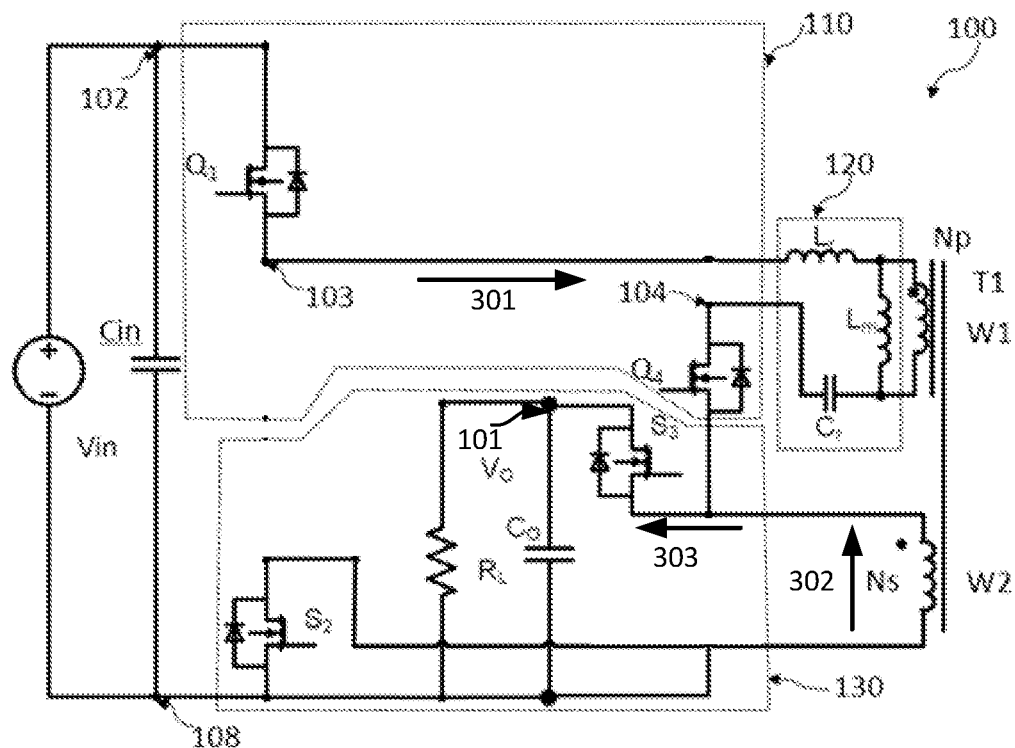
FIG. 4 shows the converter of FIG. 1 during a positive half cycle.
Figure 5:
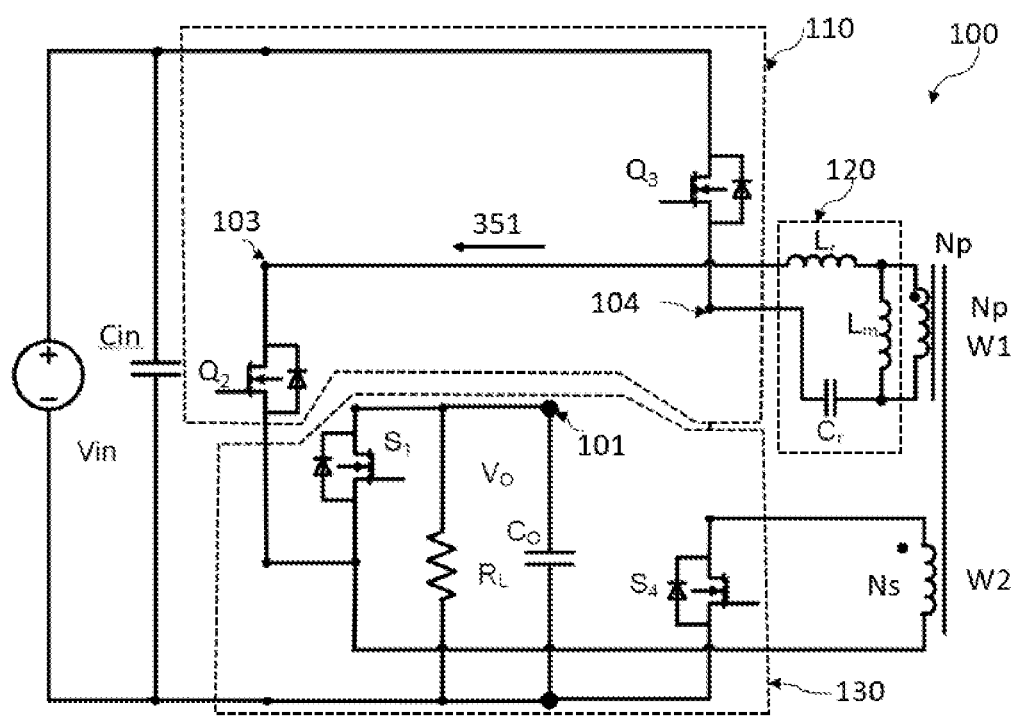
FIG. 5 shows the converter of FIG. 1 during a negative half-cycle.

An example operation of the power supply 200 is now explained with reference to FIGS. 3-5. FIG. 3 shows simulated waveforms of signals of the power supply 200. FIGS. 4 and 5 show the converter 100 during a positive half cycle and a negative half-cycle, respectively.

FIG. 3 shows a waveform 223 of a current iLr through the resonant inductor Lr (vertical axis). Note that the current iLr is sinusoidal. Accordingly, the currents through the primary winding W1 and the secondary winding W2 are also sinusoidal.

In the example of FIG. 3, a waveform 224 is a gate-source voltage Vgs (vertical axis) that is used as a control signal to switch corresponding transistors Q2, Q3, S1 and S4. A waveform 225 is a gate-source voltage Vgs (vertical axis) that is used as a control signal to switch corresponding transistors Q1, Q4, S2 and S3. In the example of FIG. 3, the horizontal axis indicates time. A time period t0-t1 is during a positive half-cycle when the current iLr is flowing in the positive direction, i.e., from the first switch node 103 toward the primary winding W1, and a time period t1-t2 is during a negative half-cycle when the current iLr is flowing in the negative direction, i.e., from the second switch node 104 toward the primary winding W1.

FIG. 4 shows the converter 100 during the positive half-cycle, which is the time period t0-t1 in FIG. 3. During the positive half-cycle, the transistors Q1, Q4, S2, and S3 are ON, whereas the transistors Q2, Q3, S1 and S4 are OFF.

Components that are not in play during the positive half-cycle are not shown in FIG. 4 for clarity of illustration.

When the transistors Q1 and Q4 are ON and the transistors Q2 and Q3 are OFF, the current iLr flows through the resonant inductor Lr in a positive direction toward the primary winding W1 (see arrow 301). This is reflected by the positive value of the current iLr during this time (see FIG. 3, waveform 223 during t0-t1). From the second end of the primary winding W1, a current flows through the transistor Q4, and then through the transistor Q4 toward the output voltage node 101. In accordance with the transformer dot convention, the positive current iLr induces current to flow through the secondary winding W2 toward the source of the transistor S3 (see arrow 302), and then through the transistor S3 (see arrow 303) toward the output voltage node 101.

FIG. 5 shows the converter 100 during the negative half-cycle, which is the time period t1-t2 in FIG. 3. During the negative half-cycle, the transistors Q2, Q3, S1, and S4 are ON, whereas the transistors Q1, Q4, S2 and S3 are OFF. Components that are not in play during the negative half-cycle are not shown in FIG. 5 for clarity of illustration.

When the transistors Q2 and Q3 are ON and the transistors Q1 and Q4 are OFF, the current iLr flows through the resonant inductor Lr in a negative direction from the primary winding W1 toward the first switch node 103 (see arrow 351), and through the transistors Q2 and S1 toward the output node 101. This is reflected by the negative value of the current iLr during this time (see FIG. 3, waveform 223 during t1-t2). In accordance with the transformer dot convention, the negative current iLr induces current to flow through the secondary winding W2 in a direction toward the source of the transistor S1 (see arrow 352), through the transistor S1, and toward the output voltage node 101.

Compared to conventional topologies, in the converter 100, the primary side current runs directly to the output voltage node 101, and thus the secondary transistors S2 and S4 and the secondary side winding W1 only processes partial load current, although the secondary transistors S1 and S3 process full load current. As a result, the power density of the converter 100 is reduced. And thus, the efficiency of the converter 100 is improved and the cost is reduced.

Figure 6:
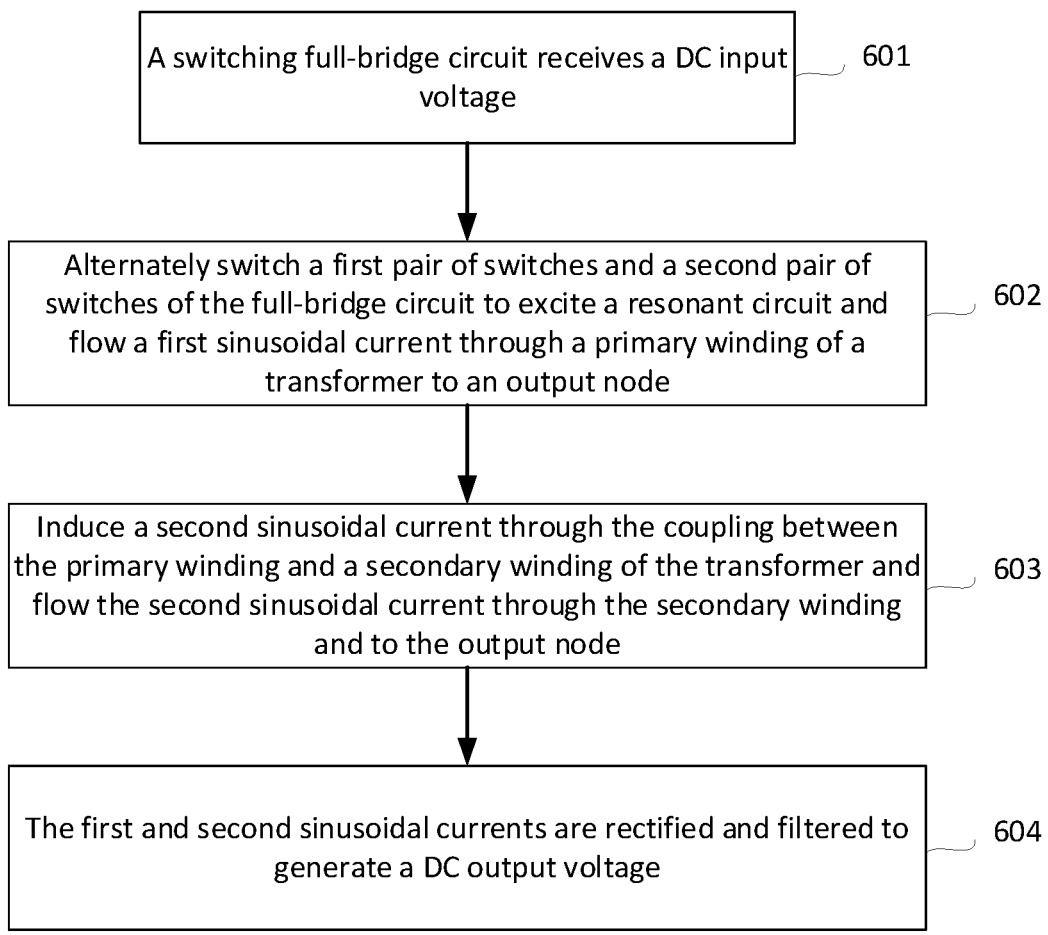
FIG. 6 shows a flow diagram of a method of generating an output voltage of an LLC resonant converter in accordance with an embodiment of the present invention.

FIG. 6 shows a flow diagram of a method 600 of generating an output voltage of an LLC resonant converter in accordance with an embodiment of the present invention. The method 600 may be performed by the components of the converter 100. As can be appreciated, other components may also be employed without detracting from the merits of the present invention.

In the method 600, a switching full-bridge circuit receives a DC input voltage (step 601). The switching full-bridge circuit includes a first pair of switches and a second pair of switches with each pair of switches being alternately switched ON and OFF to excite a resonant circuit and flow a first sinusoidal current through a primary side of a transformer and then to an output node (step 602). The sinusoidal current through the primary winding of the transformer induces a second sinusoidal current through the coupling between the primary winding and the secondary winding and the second sinusoidal current flows through a secondary side of the transformer and then to the output node (step 603). The first and second sinusoidal currents through the primary and secondary sides of the transformer are rectified by a bridge rectifier and filtered by an output capacitor to generate a DC output voltage (step 604).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An LLC resonant converter comprising:
    a switching full-bridge circuit comprising a first transistor, a second transistor, a third transistor and a fourth transistor with each transistor having a first end and a second end, the first ends of the first transistor and of the third transistor being connected to a DC input voltage, the second ends of the first transistor and of the third transistor being respectively connected to the first end of the second transistor and to the first end of the fourth transistor;
    a transformer comprising a primary winding and a secondary winding with each winding having a first end and a second end, the first end of the secondary winding being connected to the second end of the fourth transistor and the second end of the secondary winding being connected to the second end of the second transistor;
    a resonant circuit comprising a resonant capacitor, a resonant inductor, and a magnetizing inductance of the primary winding of the transformer, the resonant circuit being connected between a first switch node formed by the first and second transistors and a second switch node formed by the third and fourth transistors; and
    a bridge rectifier that is connected between the first end and the second end of the secondary winding to generate a rectified output signal that is filtered to generate a DC output voltage at an output node.

2. The LLC resonant converter of claim 1, wherein the resonant capacitor, the resonant inductor and the magnetizing inductance of the primary winding form a series circuit connected between the first switch node and the second switch node.

3. The LLC resonant converter of claim 1, wherein the bridge rectifier comprises a fifth transistor and a sixth transistor connected to the secondary winding.

4. The LLC resonant converter of claim 3, wherein the bridge rectifier further comprises a seventh transistor and an eighth transistor with each transistor having a first end and a second end, and wherein the first ends of the fifth transistor and of the seventh transistor are connected to the output node, and the second end of the fifth transistor is connected to the first end of the sixth transistor and to the second end of the secondary winding, and the second end of the seventh transistor is connected to the first end of the eighth transistor and to the first end of the secondary winding, the second ends of the sixth transistor and of the eighth transistor are connected to a reference node.

5. The LLC resonant converter of claim 4, further comprising:
    an output capacitor comprising a first end that is connected to the first ends of the fifth and seventh transistors and a second end that is connected to the second ends of the sixth and eighth transistors.

6. The LLC resonant converter of claim 5, wherein each of the first, second, third, fourth, fifth, sixth and seventh and eighth transistors comprises a metal-oxide-semiconductor-field-effect-transistor (MOSFET).

7. A power supply comprising:
    a switching full-bridge circuit comprising a first transistor, a second transistor, a third transistor and a fourth transistor with each transistor having a first end and a second end, the first ends of the first transistor and of the third transistor being connected to a DC input voltage, the second ends of the first transistor and of the third transistor being respectively connected to the first end of the second transistor and to the first end of the fourth transistor;

a transformer comprising a primary winding and a secondary winding with each winding having a first end and a second end, the first end of the secondary winding being connected to the second end of the fourth transistor and the second end of the secondary winding being connected to the second end of the second transistor;

a resonant circuit comprising a resonant capacitor, a resonant inductor, and a magnetizing inductance of the primary winding of the transformer, the resonant circuit being connected between a first switch node formed by the first and second transistors and a second switch node formed by the third and fourth transistors;

a bridge rectifier that is connected between the first end and the second end of the secondary winding to generate a rectified output signal that is filtered to generate an DC output voltage at an output node; and an LLC resonant controller that is configured to generate control signals that control switching of the first, second, third, fourth transistors to generate the DC output voltage on an output capacitor.

8. The LLC power supply of claim 7, wherein the resonant capacitor, the resonant inductor and the magnetizing inductance of the primary winding form a series circuit connected between the first switch node and the second switch node.

9. The LLC power supply of claim 7, wherein the bridge rectifier comprises a fifth transistor and a sixth transistor connected to the secondary winding.

10. The LLC power supply of claim 9, wherein the bridge rectifier further comprises a seventh transistor and an eighth transistor, and wherein the first ends of the fifth transistor and of the seventh transistor are connected to the output node, and the second end of the fifth transistor is connected to the first end of the sixth transistor and to the second end of the secondary winding, and the second end of the seventh transistor is connected to the first end of the eighth transistor and to the first end of the secondary winding, second ends of the sixth transistor and of the eighth transistor are connected to a reference node.

11. The LLC power supply of claim 10, wherein the LLC resonant controller is further configured to generate control signals that control switching of the fifth, sixth, seventh, eighth transistors to generate the DC output voltage on the output capacitor.

12. The LLC power supply of claim 10, wherein the output capacitor comprising a first end that is connected to the first ends of the fifth and seventh transistors and a second end that is connected to the second ends of the sixth and eighth transistors.

13. The LLC power supply of claim 10, wherein each of the first, second, third, fourth, fifth, sixth and seventh and eighth transistors comprises a metal-oxide-semiconductor-field-effect-transistor (MOSFET).

14. A method of generating an output voltage at an output node of an LLC resonant converter, the method comprising:
   alternately switching a first pair of switches and a second pair of switches of a switching full-bridge circuit to excite a resonant circuit and to flow a first sinusoidal current through a primary side of a transformer and to the output node;
   inducing a second sinusoidal current through a coupling between a primary winding and a secondary winding of the transformer and flowing the second sinusoidal current through a secondary side of the transformer and to the output node;
   rectifying, by a bridge rectifier, the first and second sinusoidal currents that flows through the primary and secondary sides of the transformer; and
   filtering a rectified output of the bridge rectifier to generate the output voltage of the LLC resonant converter.

15. The method of claim 14, wherein filtering the rectified output of the bridge rectifier includes placing an output capacitor across the bridge rectifier.

16. The method of claim 15, wherein alternately switching the first pair of switches and the second pair of switches comprises:
   during a positive half-cycle, switching on the first pair of switches and switching off the second pair of switches to flow the first sinusoidal current toward a first end of the primary winding; and
   during a negative half-cycle, switching off the first pair of switches and switching on the second pair of switches to flow the first sinusoidal current toward a second end of the primary winding.

17. The method of claim 15, wherein inducing the second sinusoidal current comprises:
   during a positive half-cycle, flowing the second sinusoidal current toward a first end of the secondary winding; and
   during a negative half-cycle, flowing the second sinusoidal current toward a second end of the secondary winding.

18. The method of claim 14, further comprising providing an input voltage to the switching full-bridge circuit.

* * * * *